(12) United States Patent
Peterson

(10) Patent No.: US 7,363,723 B1
(45) Date of Patent: Apr. 29, 2008

(54) MEASURING DEVICE

(76) Inventor: Eugene Troy Peterson, 58 Second Ave., Chula Vista, CA (US) 91910

( * ) Notice: Subject to any disclaimer, the term of this patent is extended or adjusted under 35 U.S.C. 154(b) by 0 days.

(21) Appl. No.: 11/580,575

(22) Filed: Oct. 12, 2006

(51) Int. Cl.
*G01B 3/10* (2006.01)
(52) U.S. Cl. .......................................... 33/760; 33/156
(58) Field of Classification Search ................. 33/760, 33/762, 763; 702/156, 158
See application file for complete search history.

(56) References Cited

U.S. PATENT DOCUMENTS

| | | | |
|---|---|---|---|
| 4,195,348 A | 3/1980 | Kakutani | |
| 4,578,768 A | 3/1986 | Racine | |
| 5,161,313 A | 11/1992 | Rijlaarsadam | |
| 5,230,159 A | 7/1993 | Lipsey | |
| 5,426,863 A | 6/1995 | Biggel | |
| 5,433,014 A * | 7/1995 | Falk et al. | 33/763 |
| 5,847,641 A * | 12/1998 | Jinbo | 702/158 |
| 5,983,514 A | 11/1999 | Lindsey | |
| 6,574,582 B1 * | 6/2003 | Geiger | 702/154 |
| 6,898,866 B2 | 5/2005 | Weeks | |
| 2006/0025706 A1 * | 2/2006 | Chen | 33/763 |
| 2006/0089817 A1 | 4/2006 | Spanski et al. | |

* cited by examiner

*Primary Examiner*—G. Bradley Bennett
(74) *Attorney, Agent, or Firm*—Donn K. Harms

(57) ABSTRACT

A hand held measuring device for measuring for construction or other industries using measuring tapes to ascertain measurements. The device features an extendable tape engaged to an electronic sensor communicating the measurement to a data processor and digital display. Software operating on the data processor stores and employs the taken measurements to estimate time and materials for a given industry. The software may be changed by engaging a memory card with industry specific software adapted to employ the measurements taken for calculations. A camera will take digital photos of measured areas and store them in association with individual measurements. A second video display provides a software driven graphic interface for display and input of data.

20 Claims, 1 Drawing Sheet

MEASURING DEVICE

FIELD OF THE INVENTION

This invention deals with the instruments for measuring dimensions. More particularly, the disclosed device relates to measuring tapes used for everyday measuring for construction, manufacturing, estimation, and the like. Using a unique coupling of electronics and mechanical components, the disclosed measuring device eliminates the need to transfer measurements visually accessed from a tape to paper or other storage media. It also eliminates the errors frequently encountered when figures must be taken visually and transposed to written form. In modes of the device with additional capabilities, actual calculations for differing construction, recording, estimating, and manufacturing requirements may be provided by the device. Still further, the device may be linked to a computer network for transfer of stored measurements to a remote location for use enhancing delivery times for everything from remodeling to home appraisals.

BACKGROUND OF THE INVENTION

Tape measures are commonly used throughout the world in numerous trades and by professionals and amateurs alike. Carpenters, mechanics, construction workers, architects, designers, painters, real estate estimators, textile manufacturers, and workers in many other professions as well as do-it-yourselfers employ tape measures on a regular basis. Mechanical tape measures conventionally extend a tape of metal, plastic or fabric from a wound position inside a casing, to an extended position a distance from the edge of the casing. Because of their compact size and concurrent ability to measure distances many times the size of the casing in which they are wound, tape measures are an indispensable tool for their users.

When a tape measure is employed by an amateur or professional, there is generally a need to record each measurement taken to calculate some type of requirement, or to build or manufacture some type of component to occupy the space measured. A vexing problem which frequently arises is the high possibility of error in transcribing the measurements viewed by the user onto paper. Busy professionals are frequently interrupted while taking complex measurements for custom installations, retrofit, or repairs. Consequently, it is all too easy for such a user to view the measurement printed on the tape, and either forget to write it down, or to write it down incorrectly. Incorrect transcription can also happen if the user has poor eyesight, or dyslexia, or for a myriad of other reasons. The same errors occur more often with do-it-yourself users and amateurs.

Further, even with the correct measurements, tape measure users who transcribe the measurements viewed on the tape onto paper still must use those measurements for calculation of the ultimate reason for the measurements. For example, drywall installers must at some point buy the correct amount of drywall for the measured areas and then cut the drywall to the sizes measured. Painters must measure the area of wall surfaces to be painted, ascertain how many coats of paint are required, and then purchase sufficient paint in gallons to cover the total aggregate surface area measured. Another example would be carpenters or wall framers who must measure the length, width, and height of areas for designated walls. All the measurements must be transcribed to paper or some other means for recording them, whereafter the amount of wood and nails required for the job will have to be determined. Building codes and other issues can affect this total of materials needed. A multitude of other jobs and products depend upon accurate measurements using a tape measure and accurate transcription of each measurement to a record and subsequent accurate calculation from the recorded measurements of the products to purchase or custom components to manufacture using the recorded measurements.

As can be ascertained, this process is fraught with peril for the amateur and infrequent user of the tape measure and is overly time-consuming and poses the risk of mental and transcription errors when employed by the professional. Further, with no real template or means for orderly calculation of the different trades and tasks for which the measurements are taken, many hours can be lost in making the ultimate products, and much waste can occur with improperly purchased or manufactured products using improperly recorded or calculated measurements.

U.S. Pat. No. 5,230,159 (Lipsey) teaches a device with a calculator releasably attached to a conventional tape measure. However, Lipsey simply provides a calculator in the proximity of the tape to the user and offers no organized means of recording measurements that are trade-specific or which are stored for use in relation to each other and the trade for later custom fabrication.

U.S. Pat. No. 5,426,863 (Biggel) teaches a combined tape measure and calculator and employs equally spaced holes along the length of its tape to ascertain an electronic reading. The holes are read by a number of closely spaced optical readers arranged to generate incremental unit signals for a microprocessor. Individual or sequential measurements can be taken; however, Biggel offers onboard means for an orderly recording of related measurements and total aggregate measurements. Neither does Biggel provide any means to change the tape to provide calculations and measurement storage in a manner conventional to individual trades like carpentry or drywall and the like.

U.S. Pat. No. 5,161,313 (Rijlaarsadam) discloses a wheeled measuring and calculating instrument for the determination of lengths, areas, peripheries and volumes. However, this device too lacks any onboard storage of data in a manner that allows logical relation of measurements to each other, and in a trade-specific format that provides for both calculation of materials, and storage of related measurements for use to cut or build components to size.

Other combinations of measuring instruments with simple calculators are taught as well as numerous manners for electronic, magnetic, and optical reading of the tape extension to an electronic display and calculator. However, such devices provide no means to adapt the measuring device to the trade for which it is being used and to provide means to store the measurements in a relational form for later use, nor any industry specific calculation ability that aids individual professional and amateur users with error free and accurate calculations and renditions of the measurements.

Consequently, none of these previous efforts in the art provide the benefits attendant with the present invention. The present invention achieves its intended purposes, objects and advantages over the prior art devices through a new, useful and unobvious combination of method steps and component elements, with the use of a minimum number of functioning parts, at a reasonable cost to manufacture and by employing readily available materials.

As such, there exists a need for a tape measure that will provide indicia on the tape itself for a visual read of the measurement and concurrently provide an electronic means of display and recording of each measurement taken. Such a device should allow for easy recording and storage of each measurement, with no need to use a paper or pencil or write down the viewed measurement. Such a device should not only record each measurement, but do so in relation to the other measurements taken for each item measured.

Additionally, such a device should allow for on-site calculation of material required for the trade for which the measurements are taken, using the input measurements. The calculations made by the device should be adaptable to any trade for which the device is used. For example, carpenters should be able to use the device to record measurements and calculate wood requirements or to form structures from wood based on the measurements. Drywall installers should be able to take the measurements, store them, calculate materials to be used, and print lists of drywall dimensions to cut from the material. Or, a home appraiser or carpet installer should be able to record measurements by room and later use them for calculations as to size of the home or carpet needed.

Ideally then, the device should employ a basic component that provides a mechanically extending tape that provides visual means to ascertain a measurement, and using one or a plurality of input buttons to record an electronic rendition of each measurement without having to write or transcribe the measurement viewed. Preferably, this recording of measurements should be accomplished without taking the user's hand off the measuring tape. Further, the device should have a user adaptable or configurable data processing capability that allows for calculations for materials and/or custom dimensions of components to be formed, which relate to the trade for which the measurements are taken. This data processing ability should ideally be adapted to accept one or a plurality of programming packages in the base unit, each of which are adapted to the trade for which the measurements are being taken. Preferably such programming packages that are executed on the data processor of the device will supply templates for orderly means for recording of the measurements as they are taken and as they relate to each other and the trade. Ideally, the software programming would provide a simple graphic interface for the measurements during their taking and for calculations as to materials required and depictions of components to be cut. Finally, it would be especially useful for many users if a camera were included and engaged to the data processor to associate a photograph with one or a plurality of measurement sets to provide the user with a visual reference to the location of the measurements.

In this respect, before explaining at least one embodiment of the invention in detail it is to be understood that the invention is not limited in its application to the details of construction and to the arrangement of the components set forth in the following description or illustrated in the drawings. The invention is capable of other embodiments of being practiced and carried out in various ways. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present invention. It is important, therefore, that the claims be regarded as including such equivalent construction insofar as they do not depart from the spirit and scope of the present invention.

OBJECTS OF THE INVENTION

It is a general object of this invention to provide a tape measure device that has an eye-readable display on an extendable measuring tape, and concurrently provides an identical electronic rendition of the measurements taken to a data processing device.

It is a further general object of the invention to supply such a device that eliminates the need to remove the user's hand from the device to record measurements.

Another object of this invention is to eliminate the need to read the measured distance on the extended tape and record it in writing and thereby also alleviate errors in transcription that inevitably occur.

Yet another object of this invention is to supply such a combination measuring and data processing device that allows for user engageable software that renders the device and its measurements trade-specific.

Another object of this invention is to supply such a device with both measurement and onboard data processing that provides a user interface for storage of measurements as they relate to each other and calculations that are industry or trade-specific as to materials, time, and other industry-specific data that can be ascertained from measurements taken.

Yet a further object of this invention is the provision of a base device of measuring tape and coupled data processor that may be engaged to memory components that both house industry-specific software as an interface and allows for storage of measurements taken on removable memory media for transport to other computing devices.

An additional object of this invention is the provision of such a measuring tape and data processor combination that may be linked to a network using radio or optical communications to a node allowing real time or on-demand transmission of measurements to a remote location.

Yet another object of this invention is providing a measuring tape and data processor combination that will provide an interface to store and depict graphic depictions on a device mounted, or remote visual display, of measurements taken which relate to thereby provide a visual cue for a piece of material to be cut to the shape rendered.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The device herein disclosed and described provides an improved measuring device which eliminates errors in transcription thereby increasing accuracy. The device features an exterior housing sized to accommodate an extendable tape in an interior cavity. The tape is biased to wind into the housing through an opening as is conventional with tape measures.

Also operatively positioned on the housing is an alpha-numeric keypad for user input to an internal data processor. A number of function keys for signaling to the processor an input of width, length, and height are provided which are placed on the same side as the opening for the tape to allow the user to hold the device while signaling an input instead of having to put it down or rotate it. A video display preferably of an LCD type is provided on a side surface for use with a preferable graphic interface provided by onboard or loadable software. Also provided in the preferred mode is an electronic measurement display on a top surface easily viewed while holding the tape for a measurement and which can be either an LCD or LED or similar low power display. This measurement display is an electronic version of the measurement taken with the tape and can be used to both verify that the tape and the electronic measurement are the same, or, in place of reading the tape where user eyesight may be lacking or the light poor for reading.

In a simple mode of the device an onboard data processor with requisite ROM and/or Ram memory is placed in operative electronic engagement with the input pad, the video display, the number display, and some means for concurrent electronic determination of the measurement taken by the tape when extended for a measurement. Many such means for electronic tape measurement are available, including magnetic and optical types and any electronic measuring component as would occur to those skilled in the art is anticipated.

During every measurement taken with the tape by a user, the data processor would communicate that measurement to the numeral display for easy reading and validation with the tape if desired. The current measurement may also be depicted on the video display, and depending on the graphic interface and software, it can be used or stored in a manner that it relates to other appropriate measurements taken. The photos would be thus associated by the software with one or a plurality of measurements taken.

The device in the simplest yet novel form can be employed to make and store two and three dimensional measurements without the need to transcribe them to paper or other physical or electronic media by hand. However, in the most preferred mode, one base model of the device would be sold that would have the functions of measurement and photograph and digital storage of the measurements, but would be customizable to a given trade to which it is being employed. Software adapted to provide a graphic interface and to store and associate measurements and digital photos in a manner organized to the trade would be provided. Carpenters can purchase the base model and upgrade its capability to their individual trade by adding a memory chip or other means of programming that will provide the data processor industry specific data, interfaces, and data storage and retrieval routines that can be employed in combination with the measurements stored for making even more accurate calculations about time and materials required. The software would provide graphic interfaces on the display that would be organized to the trade, store measurements in a fashion that would be organized to the trade, and have a lookup table and libraries of stored information specific to the trade. In the case of a carpenter, measurements taken could immediately be converted into a bill of materials needed using the onboard data as to how much lumber and nails would be required to frame the walls just measured.

In use by a painter, the base device would be purchased and the painting software and data chip added and engaged into the device. The painting specific software would use the stored measurements taken to calculate wall surfaces for painting by a painter. Screens would be organized toward input and display of painter information. As in all the specialized versions with specialized software, buttons adjacent to the video display would assume new and trade specific operations which would be associated with the buttons and operate the software and graphic interface on the visual display providing menus that are industry specific to painting.

In the case of painting, the software, of course, would be adapted to calculate time and/or material for the painting job measured based on the sum of individual and aggregate total of all the final measurement notations held in memory. Included would be software routines for the painting trade to ascertain the gallons of paint required to cover the total area determined by the sum of the final measurement notations which were the two dimensional wall surface areas ascertained as the sum of the length and width of each wall measured. Also using the measurements taken, other materials and/or labor can be easily calculated with no transcription of the taken measurements using a library of industry specific calculation related to the area of measurements taken and stored in the device. The software can even break down the job measured into individual areas and store them as individual sub-jobs, since painting one job site may involve many different colors and textures in many different rooms.

Of course software can be provided for every type of industry which uses two and three dimensional measurements to ascertain the job requirements and thereafter calculate the time and materials to be used based on the industry standards for such. All would work using the base device and adding or reprogramming it to work with that specific industry easily. If software on a remote computer is to be employed using the data of measurements, it would be stored in an appropriate format and communicated electronically to another computer either by wireless or wired communication. Or the data may be stored physically in proper format for the intended calculating software on a removable chip memory which can then be engaged with the remote computer.

Finally, in an especially preferred mode of the device, a digital camera would also be provided. The camera would allow the user to photograph each area measured, and using onboard or loaded software, associate it with the measurements taken. This would be especially helpful in highly customized areas of construction where the surface or material being custom cut is done so at a place remote to the actual installation site. In combination with the electronic measurements and graphic depictions available of the two dimensional areas measured, a photograph when associated electronically with specific measurements can help alleviate errors and can provide much needed visual aids to the fabrication personnel who may not be able to visualize the job at hand using the two dimensional stored measurements on the device.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

BRIEF DESCRIPTION OF THE DRAWINGS

The accompanying drawings, which are incorporated in and form a part of this specification, illustrate embodiments of the invention and together with the description serve to explain the principles of this invention.

DETAILED DESCRIPTION OF THE PREFERRED EMBODIMENTS

Figure 1:
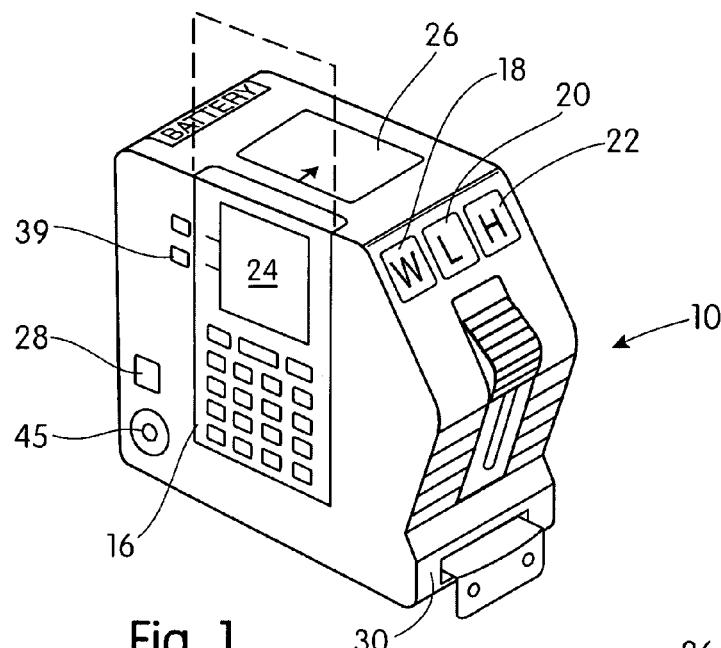
FIG. 1 depicts a perspective view of the device showing a first side surface having an alphanumeric input communicating with an onboard data processor and video display for a graphic interface.
Figure 2:
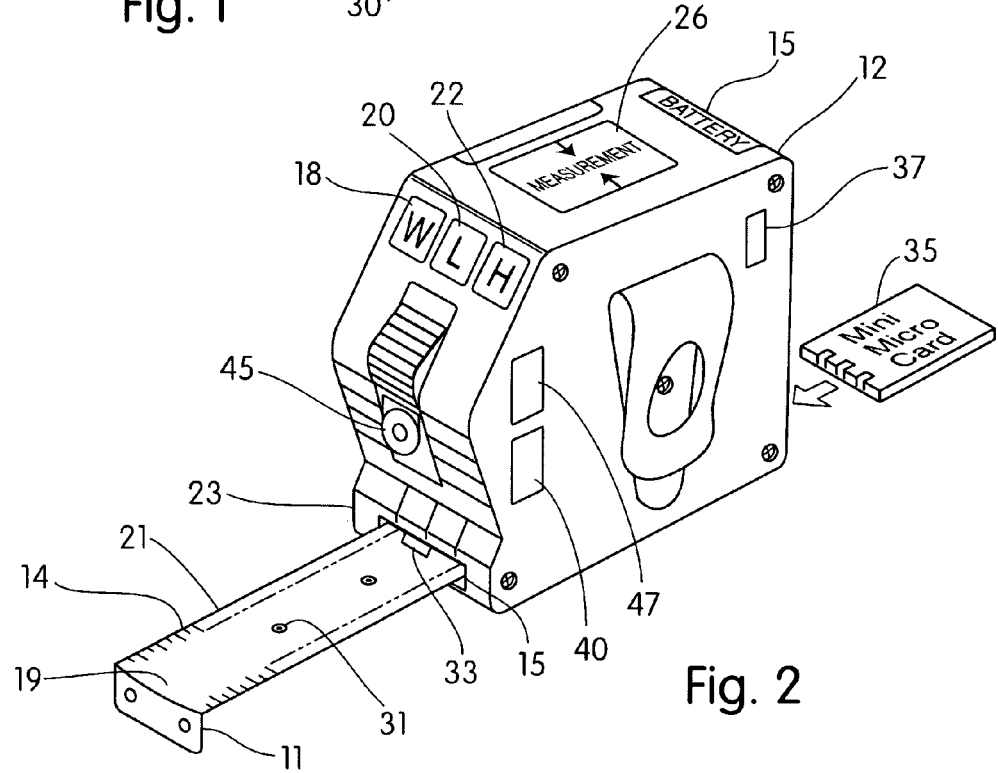
FIG. 2 depicts a perspective view of the device showing a top electronic measurement display and engageable electronic memory component having onboard industry specific software and/or storage and transport of obtained measurements along with a camera adapted to photograph along the line of measurement.

Referring now to the drawings 1-2, wherein similar parts of the invention are identified by like reference numerals, there is seen in FIG. 1 a perspective view of the disclosed device 10 showing the housing 12 which houses the extendable tape 14. Also engaged to the housing is an alphanumeric input pad 16 a plurality of function keys for width 18, length 20, and height 22 input designation, a video display 24, and an electronic measurement display 26 which can be either an LCD or LED or similar electronic means for display will provide a user-readable display of the electronic rendition of the measurement taken with the tape 14. Of course the device will function with a single electronic video display 24 producing the graphic displays of both the video display 24 and the measurement display 26. However, both displays make the device easier to use if the measurement display is on a top surface and easy to view while measuring. This user-readable display 26 can be used to both verify that the tape and the electronic measurement are the same, or, in place of reading the tape for persons with eye trouble, the display 26 may be backlit or use larger fonts than the tape 14 making it easier to read. A battery 15 would power the device 10.

In the simplest form of the device 10, the onboard data processor and memory 28 would be in operative electronic engagement with the input pad 16, the video display 24, the numeral display 26, and electronic means 15 for determination of the measurement or extension of the tape 14. Many such electronic means for electronic determination of the extension of the tape 14, from the housing 10 to the distal end 17 of the tape 14 are well known to those skilled in the art. For instance, once such system features an elongated conductor strip 19 constructed of a magnetic material that is attached longitudinally into a recess in the tape 14. An electronic reading component 23 adjacent to the tape 14 actuates a signal magnetically relative to the position of extension of the tape 14. Or the device can employ one or a combination of magnetic means for reading tape extension such as an embedded magnetic strip 19 within a longitudinal recess of the tape 14, a mechanical means which measures the tape 14 as it extends, measuring the length of tape and which converts the length to an electronic signal, or an optical means for determining the tape measurement such as indicia 21 in the form of dots 31, a bar code, a three dimensional bar code, or other indica on the tape surface and an optical electronic reader 23 or other optical electronic means to read that indicia 21 placed adjacent to the opening 30, or holes 31 punched through the tape 14 which may be counted by the electronic sensor 33, engaged adjacent to the opening 30, which would count the holes as they traverse the reader, or any other means for determination of a measurement distance of the tape 14 from its distal end 17 to the measurement point on the housing 12 or other frame of reference used, and converting that distance to an electronic signal and communicating that electronic version of the distance, electronically to a data processor 28.

The data processor 28 would be operatively electronically engaged to the employed means for electronic measurement determination of the measurement taken by the tape 14 and would concurrently communicate that measurement for viewing on the measurement display 26 and/or the video display 24 such that a digital rendition of the measurement taken by the tape 14 would be viewable to the eyes of the user each time a measurement is taken.

Also provided in the preferred mode of the device, the buttons for width input 18, length input 20, and height input 22 are placed on the side surface of the housing 12 such that they may be easily depressed by the thumb of the user without having to take their hand off the housing 12. This is most desirable because of the ease of use this placement provides in combination with the electronic measurement display 26.

In use, in the simplest form the user would extend the tape 14, view the digital measurement on the display 26, and if determined to be correct, press one of the three buttons for length, width, or height, which will cause the measurement to be stored in the computer memory of the device.

As noted earlier, the device 10 will have a data processor and memory 28 onboard and software in the base model. This will allow for the taking of simple measurements as to length, width, height, and storage of a final stored measurement notation, depending on the actions of the user. It is these stored final measurement notations which act as a common unit of measurement for a plurality of trades and uses that will allow the device to provide great utility to the user, depending on the software loaded into the processor.

In use, a taking of a first measurement for length by extending the tape 14 and pressing of the length button 20, causes storage for that measurement in one of three ways as a final measurement notation, depending on the second action by the user. If the save button 40 is pressed after the first measurement, the device will save the measurement as a separate distinct final measurement notation which may be recalled later from one or a plurality of such notations acquired during a session of use. However, if the user, instead of pressing the save button 40 takes a second measurement and presses the width button 18, the device will automatically assume that at least an area measurement is desirable and that a graphic depiction of the two dimensional area may also be desirable and will hold the two measurements in memory awaiting a final action by the user. If the user at this point takes a third measurement and presses the height button 22, software on the device will automatically assume that the common unit of measurement is volume and will multiply the three measurements and store them in a final measurement notation of volume. If, however, after the second measurement is taken the user simply presses the store button 40 again, the software on the device will cause the device 10 to assume the common unit of measurement is an area, and the device will immediately store a final measurement notation of the area.

All of the individual final measurement notations stored in memory may be offloaded as an electronic file on an engageable memory card 35 for use on a computer or other electronic component having software adapted to employ the final measurement notations stored for production or planning of a project. Or, the device may be equipped with electronic means for transmission 37 of stored data such as an Infrared or Bluetooth transmitter which can communicated the data to the appropriate receiving device or over a network to a receiving computer or device as needed.

This ability to offload the data stored manually on the memory card 35 allows for easy transport of information of each job. When communicated electronically using the transmission means 37 to a network, the device 10 will allow a workman in the field to take measurements, and in real time or soon after finished, transmit the measurements to the factory or their office for use, all without using paper and a pencil. This not only speeds up the final production of whatever is being measured, it also eliminates the most likely place for errors which is transcription by the user from a viewing of the measurement to paper.

In the most preferred mode of the device 10, the base model with the aforementioned onboard input routines and data processor 28 to determine the common unit of measurement and store all final measurement notations, can be customized to the trade to which it is being employed. This customization can be done by the provision of software on the memory card 35 or over electronic transmission means 37 that will provide the device 10 with software for industry-specific measurements and optionally, with a graphic interface for input of measurements. Further, the industry-specific software will enable the device 10 onboard ability to make calculations for materials and time for the trade for which it is programmed using the final measurement notations taken and stored by the device 10. Such software would also optionally enable specific functions to programmable input buttons 39 adjacent to the display which thereafter would be useable to input a specific input programmed to that button 39.

For instance, if the device 10 is being used to measure wall surfaces for painting by a painter, the memory card 35 would be preprogrammed with software and optionally graphic interfaces for the visual display 24 that are adapted for painting. This would include calculations for materials and/or labor times based on the sum of all the final measurement notations held in memory. Using the software routines for the painting trade and stored data as to volume of paint required for the total area determined by the sum of all the final measurement notations, and labor times for application of such, the device may be employed on the job site to measure the areas to be painted, and then easily calculate the amount of paint and/or time required for the job.

In a simpler version the software would store the individual final measurement notations and provide the user with a final input signaling means to convey to the device 10 that all measurements are complete. The final input signaling means can be pressing any designated key on the keypad 16 or even the save button 40. Once completion is ascertained, the software using all the stored final measurement notations would then, from an onboard database of paint and coverage ability, calculate the material needed for the job. The measurement information can be stored by rooms by using a graphic display input provided by the software on the visual display. Further, the data stored can be communicated electronically to another computer either by storing it in proper format on the chip 35 for transport, or broadcasting it over the means for electronic transmission 37 to a computer or over a network to a server or computer.

When used for measuring by the carpet industry, the same procedure would be followed. The device 10 would be programmed with carpet industry-specific software by insertion of a programmed chip 35 by transmission over the electronic transmission means 37. The device 10, once programmed, would follow the same mode of operation allowing the user to input the individual measurements to ascertain each final measurement notation to be stored. Once the user activates the final input signaling means, the device 10 using stored data as to carpet would calculate the total amount of carpet needed for the job and/or the amount of time for the installation. As carpet is a two-dimensional industry (as is drywall, flooring and many other construction trades) with the software appropriately configured in the preferred mode, all of the individual final measurement notations, stored in two dimensions, would be reproducible graphically on the video display 24 or on a computer to which the data is communicated as a two dimensional drawing of the area measured. This would aid the user or other associated workers to use the drawings of the measured areas to pre-cut the individual carpets (or drywall, or flooring etc.) for each room or area measured. If the device communicates using electronic means of transmission 37, the total and individual final measurement notations for each area can be transmitted over a network or other electronic transmission means back to the factory in real time or once the user is finished. Again, as in the previous explanation of operation, no transcription by hand of measurements is needed, and the user can actually use the device 10 to both measure and then immediately calculate the amounts of materials needed, time for installation, and total costs for the job with the industry specific software.

Of course, the device 10 using the base unit with minimal software and data processing provides great utility over conventional tape measures. However, as noted, the device can be custom programmed to any industry from carpentry, drywall, plumbing, painting, carpeting, flooring and just about any industry where two or three dimensional measurements are converted to provide products and services.

Finally, an especially preferred component in all modes of the device 10 from the simple base model with onboard general programming to the customized model with industry specific programming loaded is a digital camera 45. As noted earlier, trades which require highly customized fabrication such as countertop construction, drywall installation, flooring and the like, can benefit from a photograph that is associated with a measured area. Using the camera 45 which is in a software and electronic engagement with the data processor and memory, the user can photograph areas measured which might be of concern or just to have later on for review. A painting oriented software could store the photo for color reference. In use, during individual measurements, or once a final measurement signal is input, the user would activate the camera by depressing a camera activation button 47 to photograph the desired area.

The onboard software would be adapted to automatically associate the photograph taken with the previously measured area. Or, with the camera 45 lens viewing the same area being measured by the tape 14 and down the same path from a declining angle toward the tape 14, the user could photograph the area being measured during one or all measurements, and automatically associate the digital photo held in memory with the stored measurement.

Pointing the camera 45 downward along the same path as the extended tape allows the photo to be taken and stored without having to change the hold or angle of the device during use and in a particularly preferred mode of the device, the camera 45 would aim in at a slight downward angle and in that direction. Or, the camera 45 may be rotatably engaged to vary the angle so as to allow the user to photograph the area for each measurement and store it associated with that measurement using the software adapted to the purpose. Still further, use of the camera 45 to store a digital image which would be associated with the measurement taken provides a means for visual reproduction of the measured area at a subsequent time and remote place. This would be most helpful when trying to match color, shape, fabric, or other aesthetic factors of the job being measured and matching them using a color digital photo of the area measured for a reference.

The tape measure and data processor with digital photo association shown in the drawings and described in detail herein disclose arrangements of elements of particular construction and configuration for illustrating preferred embodiments of structure and method of operation of the present invention. It is to be understood, however, that elements of different construction and configuration and other arrangements thereof, other than those illustrated and described, may be employed for providing the device and system in accordance with the spirit of this invention, and such changes, alternations and modifications as would occur to those skilled in the art are considered to be within the scope of this invention as broadly defined in the appended claims.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

What is claimed is:

1. A hand held measuring device for measuring by a user comprising:

a housing having an exterior surface and an interior cavity;

a flexible tape having a top surface and bottom surface;

said tape engaged to a winding mechanism in said interior cavity;

said tape extendable from said interior cavity through an aperture in an end surface of said housing, for a measurement distance;

said measurement distance being a distance between a distal end of said tape and a point of reference on said housing;

data processing means and electronic memory positioned in said housing;

a first video display viewable on said exterior surface of said housing in operative electronic communicating with said data processing means;

means for determination of said measurement distance and subsequent communication of said measurement distance electronically, to said data processor;

said first display communicating with said data processor to digitally display said measurement distance thereon;

software operable with said data processor for determining incremental measurements from an individual said measurement distance upon a user signal;

a first input signaling means electronically engaged with said data processor, said first input button activateable to provide a first user signal;

a second input signaling means electronically engaged with said data processor said second input button activateable to provide a second user signal;

a third input signaling means electronically engaged with said data processor said third input button activateable to provide a third user signal;

means to indicate a final user signal;

said software operable to ascertain a final measurement notation, upon indication of said final input;

said final measurement notation being one of, the sum of the plurality of individual of said measurement distances, or a product of the multiplication of individual of said measurement distances;

a battery for electric power operatively engaged to said measuring device; and said software storing each said final measurement notation in memory for employment in a final calculation, whereby one or a plurality of said final measurement notations are stored in electronic memory for use in ascertaining said final calculation to accomplish a task and for display on said video display.

2. The measuring device of claim 1 additionally comprising:

said final measurement notation being a two dimensional area when determined by said final user signal, subsequent to a first said user signal and a second said user signal; and said final measurement notation being a volume measurement when determined by said final user signal, subsequent to a first said user signal and a second said user signal and a third said user signal.

3. The measuring device of claim 1 additionally comprising:

industry specific software operable on said data processor;

said industry specific software having a database of materials employed in a construction trade; and said industry specific software adapted to make said calculation for said construction trade using one or a plurality of said final measurement notations, to ascertain an industry specific calculation of one or both of materials and labor required for said task.

4. The measuring device of claim 2 additionally comprising:

industry specific software operable on said data processor;

said industry specific software having a database of materials employed in a construction trade;

said industry specific software adapted to make said calculation for said construction trade using one or a plurality of said final measurement notations, to ascertain an industry specific calculation of one or both of materials and labor required for said task;

said calculation being ascertainable for area of said materials for each said final measurement notations if said final measurement notation is said two dimensional area; and said calculation being ascertainable for volume of each said final measurement notations if said final measurement notation is said volume measurement.

5. The measuring device of claim 1 additionally comprising:

a digital camera engaged to a digital camera lens operably positioned on said housing;

means to activate said camera to take a photograph; and electronic memory to store each said photograph.

6. The measuring device of claim 5 additionally comprising:

said software operable to store each said photograph associated with an individual said measurement or a final said measurement.

7. The measuring device of claim 3 additionally comprising:
- a digital camera engaged to a digital camera lens operably positioned on said housing;
- means to activate said camera to take a photograph;
- electronic memory to store each said photograph;
- said software operable to cue said user to take said photograph and thereafter store said photograph in association with an individual said measurement or a final said measurement.

8. The measuring device of claim 5 additionally comprising:
- said digital camera lens positioned on said end surface of said housing, from which said tape is extendable; and
- said digital camera lens having a raised position on said end surface yielding a downward camera angle of view toward said distal end of said tape.

9. The measuring device of claim 6 additionally comprising:
- said digital camera lens positioned on said end surface of said housing from which said tape is extendable; and
- said digital camera lens having a raised position on said end surface yielding a downward camera angle of view toward said distal end of said tape.

10. The measuring device of claim 3 additionally comprising:
- a plurality of programs of said industry specific software, each for a said specific industry employing said measuring device to obtain measurements;
- each of said plurality of programs, stored on a removably memory card;
- a receiving socket for said memory card communicating with an exterior of said housing; and
- said measuring devise being customizable to any of said plurality of industries employing said measuring device to obtain said measurements, for a calculation of time or materials, whereby said measuring device may be changed to operate with any of said programs of industry specific software, by changing to a different of said memory cards having a different said industry specific software stored thereon.

11. The measuring device of claim 4 additionally comprising:
- a plurality of programs of said industry specific software, each for a said specific industry employing said measuring device to obtain measurements;
- each of said plurality of programs, stored on a removably memory card;
- a receiving socket for said memory card communicating with an exterior of said housing; and
- said measuring device being customizable to any of said plurality of industries employing said measuring device to obtain said measurements, for a calculation of time or materials, whereby said measuring device may be changed to operate with any of said programs of industry specific software, by changing to a different of said memory cards having a different said industry specific software stored thereon.

12. The measuring device of claim 3 additionally comprising:
- said aperture being adjacent to a bottom surface of said housing;
- said first video display positioned on a top surface opposite said bottom surface of said housing;
- a second video display on a side surface of said housing;
- said second video display in operative electronic communication with said data processor; and
- said software operating on said data processor producing visual displays of said final measurements and said final calculations on said second video display.

13. The measuring device of claim 4 additionally comprising:
- said aperture being adjacent to a bottom surface of said housing;
- said first video display positioned on a top surface opposite said bottom surface of said housing;
- a second video display on a side surface of said housing;
- said second video display in operative electronic communication with said data processor; and
- said software operating on said data processor producing visual displays of said final measurements and said final calculations on said second video display.

14. The measuring device of claim 5 additionally comprising:
- said aperture being adjacent to a bottom surface of said housing;
- said first video display positioned on a top surface opposite said bottom surface of said housing;
- a second video display on a side surface of said housing;
- said second video display in operative electronic communication with said data processor; and
- said software operating on said data processor producing visual displays of said final measurements and said final calculations on said second video display; and
- said second video display providing means to display each said photograph.

15. The measuring device of claim 6 additionally comprising:
- said aperture being adjacent to a bottom surface of said housing;
- said first video display positioned on a top surface opposite said bottom surface of said housing;
- a second video display on a side surface of said housing;
- said second video display in operative electronic communication with said data processor; and
- said software operating on said data processor producing visual displays of said final measurements and said final calculations on said second video display; and
- said second video display providing means to display each said photograph.

16. The measuring device of claim 7 additionally comprising:
- said aperture being adjacent to a bottom surface of said housing;
- said first video display positioned on a top surface opposite said bottom surface of said housing;
- a second video display on a side surface of said housing;
- said second video display in operative electronic communication with said data processor; and
- said software operating on said data processor producing visual displays of said final measurements and said final calculations on said second video display; and
- said second video display providing means to display each said photograph.

17. The measuring device of claim 8 additionally comprising:
- said aperture being adjacent to a bottom surface of said housing;
- said first video display positioned on a top surface opposite said bottom surface of said housing;
- a second video display on a side surface of said housing;
- said second video display in operative electronic communication with said data processor; and said software operating on said data processor producing visual displays of said final measurements and said final calculations on said second video display; and said second video display providing means to display each said photograph.

18. The measuring device of claim 9 additionally comprising:

said aperture being adjacent to a bottom surface of said housing;

said first video display positioned on a top surface located opposite said bottom surface of said housing;

a second video display on a side surface of said housing;

said second video display in operative electronic communication with said data processor; and said software operating on said data processor producing visual displays of said final measurements and said final calculations on said second video display; and said second video display providing means to display each said photograph.

19. The measuring device of claim 3 additionally comprising:

a digital camera engaged to a digital camera lens operably positioned on said housing;

means to activate said camera to take a photograph;

electronic memory to store each said photograph; and said industry specific software operable to store each said photograph associated with an individual said measurement or a final said measurement.

20. The measuring device of claim 19 additionally comprising:

said industry specific software being specific to the painting industry; and said industry specific software storing each said phonograph as a record of a color associated with said individual said measurement or a said final measurement.

* * * * *